United States Patent
Kigure

(10) Patent No.: US 9,542,615 B2
(45) Date of Patent: *Jan. 10, 2017

(54) IMAGE PROCESSING APPARATUS AND IMAGE PROCESSING METHOD

(71) Applicant: CANON KABUSHIKI KAISHA, Tokyo (JP)

(72) Inventor: Yasuhito Kigure, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 740 days.

This patent is subject to a terminal disclaimer.

(21) Appl. No.: 13/686,358

(22) Filed: Nov. 27, 2012

(65) Prior Publication Data

US 2013/0084026 A1    Apr. 4, 2013

Related U.S. Application Data

(62) Division of application No. 12/860,504, filed on Aug. 20, 2010, now Pat. No. 8,355,575.

(30) Foreign Application Priority Data

Aug. 25, 2009    (JP) .................................. 2009-194272

(51) Int. Cl.
*G06K 9/40* (2006.01)
*G06K 9/46* (2006.01)
(Continued)

(52) U.S. Cl.
CPC .............. *G06K 9/40* (2013.01); *G06K 9/4642* (2013.01); *G06T 5/009* (2013.01); *G06T 5/40* (2013.01);
(Continued)

(58) Field of Classification Search
USPC .. 382/162, 254, 167–168, 274–275; 358/519
See application file for complete search history.

(56) References Cited

U.S. PATENT DOCUMENTS

| 6,396,963 B2 * | 5/2002 | Shaffer | ............ G06F 17/30256 |
| | | | 283/67 |
| 6,683,982 B1 * | 1/2004 | Kohn | ....................... H04N 9/11 |
| | | | 348/E9.009 |

(Continued)

FOREIGN PATENT DOCUMENTS

| CN | 1845577 A | 10/2006 |
| JP | 2006-195651 A | 7/2006 |
| JP | 2008-204474 A | 9/2008 |

OTHER PUBLICATIONS

May 6, 2015 Chinese Office Action, with an English Translation, that issued in Chinese Patent Application No. 201310323085.2.

*Primary Examiner* — Ishrat I Sherali
(74) *Attorney, Agent, or Firm* — Cowan, Liebowitz & Latman, P.C.

(57) ABSTRACT

This invention provides an image processing apparatus including a unit which generates index image data, a unit which obtains a position of thumbnail image data in the index image data, a unit which divides the index image data so as to prevent overlap of the thumbnail image data, a unit which calculates a histogram of a luminance value of image data corresponding to each partial area including the thumbnail image data, a unit which determines image correction characteristics of each piece of image data based on the histogram and performing image correction, and a unit which reconfiguring the index image data using the corrected image data to output the reconfigured index image data.

28 Claims, 9 Drawing Sheets

(51) Int. Cl.
*G06T 5/00* (2006.01)
*G06T 5/40* (2006.01)
*G06T 11/00* (2006.01)
*G11B 27/00* (2006.01)
*H04N 1/00* (2006.01)
*H04N 1/387* (2006.01)
*H04N 1/407* (2006.01)

(52) U.S. Cl.
CPC .............. *G06T 11/00* (2013.01); *G11B 27/00* (2013.01); *H04N 1/00* (2013.01); *H04N 1/387* (2013.01); *H04N 1/407* (2013.01); *H04N 1/4074* (2013.01)

(56) References Cited

U.S. PATENT DOCUMENTS

| | | | | |
|---|---|---|---|---|
| 6,870,547 | B1 * | 3/2005 | Crosby | G06F 17/30905 345/600 |
| 7,283,880 | B2 * | 10/2007 | Dick | G11B 19/022 386/239 |
| 7,570,808 | B2 * | 8/2009 | Wu | H04N 5/3572 345/20 |
| 7,668,399 | B2 * | 2/2010 | Sawano | G06T 11/60 382/162 |
| 7,715,659 | B2 * | 5/2010 | Zhao | G06K 9/00288 382/118 |
| 7,783,126 | B2 * | 8/2010 | Yamashita | G06T 5/004 382/169 |
| 8,174,731 | B2 * | 5/2012 | Hasegawa | H04N 1/00453 358/3.24 |
| 8,355,575 | B2 * | 1/2013 | Kigure | G06K 9/4642 382/168 |
| 9,077,943 | B2 * | 7/2015 | Lim | H04N 9/73 |
| 2005/0212726 | A1 * | 9/2005 | Namba | G09G 3/22 345/63 |
| 2007/0258655 | A1 * | 11/2007 | Motominami | H04N 1/0035 382/254 |
| 2010/0085361 | A1 * | 4/2010 | Kim | G06T 5/008 345/428 |

* cited by examiner

IMAGE PROCESSING APPARATUS AND IMAGE PROCESSING METHOD

CROSS-REFERENCE TO RELATED APPLICATIONS

This application is a divisional of application Ser. No. 12/860,504, filed Aug. 20, 2010 the entire disclosure of which is hereby incorporated by reference.

BACKGROUND OF THE INVENTION

Field of the Invention

The present invention relates to an image processing apparatus and an image processing method and in particular to an image processing apparatus and an image processing method, which can perform image processing to index image data including a plurality of pieces of thumbnail image data.

Description of the Related Art

There is a function of arranging thumbnail image data of a plurality of pieces of image data, recorded in storage such as a personal computer, a recorder, a built-in hard disk of a digital television, and a built-in memory of a digital camera, to generate index image data. The thumbnail image data is data obtained by reducing original image data. When the image data recorded in storage is watched on a monitor or a digital television, the image data is retrieved using the index image data of the thumbnail image data, whereby the image data that one wants to watch can be efficiently found.

In order to enhance the display quality of the index image data of the thumbnail image data, there is a technique of applying gamma correction to the index image data based on a statistic value such as an average luminance of the thumbnail image data displayed in the index image data. With this configuration, the display quality can be improved by, for example, increasing contrast of the thumbnail image data displayed in the index image data. Meanwhile, in the gamma correction, for example, when the index image data includes a large amount of thumbnail image data of image data with high luminance, the gamma correction is performed in conformity with the thumbnail image data with high luminance. When the gamma correction is applied to the thumbnail image data with low luminance, black out may occur. Namely, gamma correction processing suitable for the majority of thumbnail image data showing the same gradation tendency may be unsuitable for a minority of thumbnail image data having a gradation tendency different from the gradation tendency of the majority of thumbnail image data. This applies not only to the gamma correction, but also to other image processing such as chromatic correction.

Japanese Patent Application Laid-Open No. 2006-195651 describes a technique of sectionalizing image data into a plurality of areas and performing gradation correction for each area, and the intensity of the correction for the area including an object to be emphasized, such as a face and a person is rendered higher than the intensity of the correction for the area not including the object to be emphasized. With this configuration, it is possible to perform such a correction that in one piece of image data, only a person is emphasized and a background wall and so on are not emphasized.

SUMMARY OF THE INVENTION

In the conventional art, although the correction intensity can be made different for each area according to whether a person is seen in the area, a suitable correction for characteristics of individual pieces of thumbnail image data displayed in the index image data cannot be performed. Thus, the individual pieces of thumbnail image data cannot be displayed with a good image quality. An object of this invention is to provide an image processing apparatus and an image processing method, which, in the index image data arranged with a plurality of pieces of thumbnail image data, can perform a suitable correction for the characteristics of the individual pieces of thumbnail image data.

An image processing apparatus according to this invention comprising:

a generation unit which generates index image data that is image data including a plurality of pieces of thumbnail image data;

an acquisition unit which obtains arrangement information indicating a position where the thumbnail image data is arranged in the index image data;

a division unit which divides the index image data into a plurality of partial areas based on the obtained arrangement information, so that each of the plurality of pieces of thumbnail image data arranged in the index image data is not included in the same partial area as the other thumbnail image data;

a calculation unit which calculates a histogram of a luminance value of pixels constituting the image data corresponding to the respective partial areas including the thumbnail image data;

a correction unit which determines image correction characteristics for the respective partial areas based on the histogram, and, performs image correction to the image data corresponding to the respective partial areas using the determined image correction characteristics; and an output unit which reconfigures the index image data using the image data corresponding to the respective partial areas subjected to the image correction by the correction unit, and, outputs the reconfigured index image data.

An image processing method according to this invention comprising:

a generation step of generating index image data that is image data including a plurality of pieces of thumbnail image data, by an image processing apparatus;

an acquisition step of obtaining arrangement information indicating a position where the thumbnail image data is arranged in the index image data, by the image processing apparatus;

a division step of dividing the index image data into a plurality of partial areas based on the obtained arrangement information, so that each of the plurality of pieces of thumbnail image data arranged in the index image data is not included in the same partial area as the other thumbnail image data, by the image processing apparatus;

a calculation step of calculating a histogram of a luminance value of pixels constituting the image data corresponding to the respective partial areas including the thumbnail image data, by the image processing apparatus;

a correction step of determining image correction characteristics for the respective partial areas based on the histogram, and, performing image correction to the image data corresponding to the respective partial areas using the determined image correction characteristics, by the image processing apparatus; and an output step of reconfiguring the index image data using the image data corresponding to the respective partial areas subjected to image correction in the correction step, and, outputting the reconfigured index image data, by the image processing apparatus.

According to the image processing apparatus of this invention, in the index image data arranged with a plurality of pieces of thumbnail image data, a suitable correction for the characteristics of the individual pieces of thumbnail image data can be performed.

Further features of the present invention will become apparent from the following description of exemplary embodiments with reference to the attached drawings.

DESCRIPTION OF THE EMBODIMENTS (First Embodiment)

Figure 1:
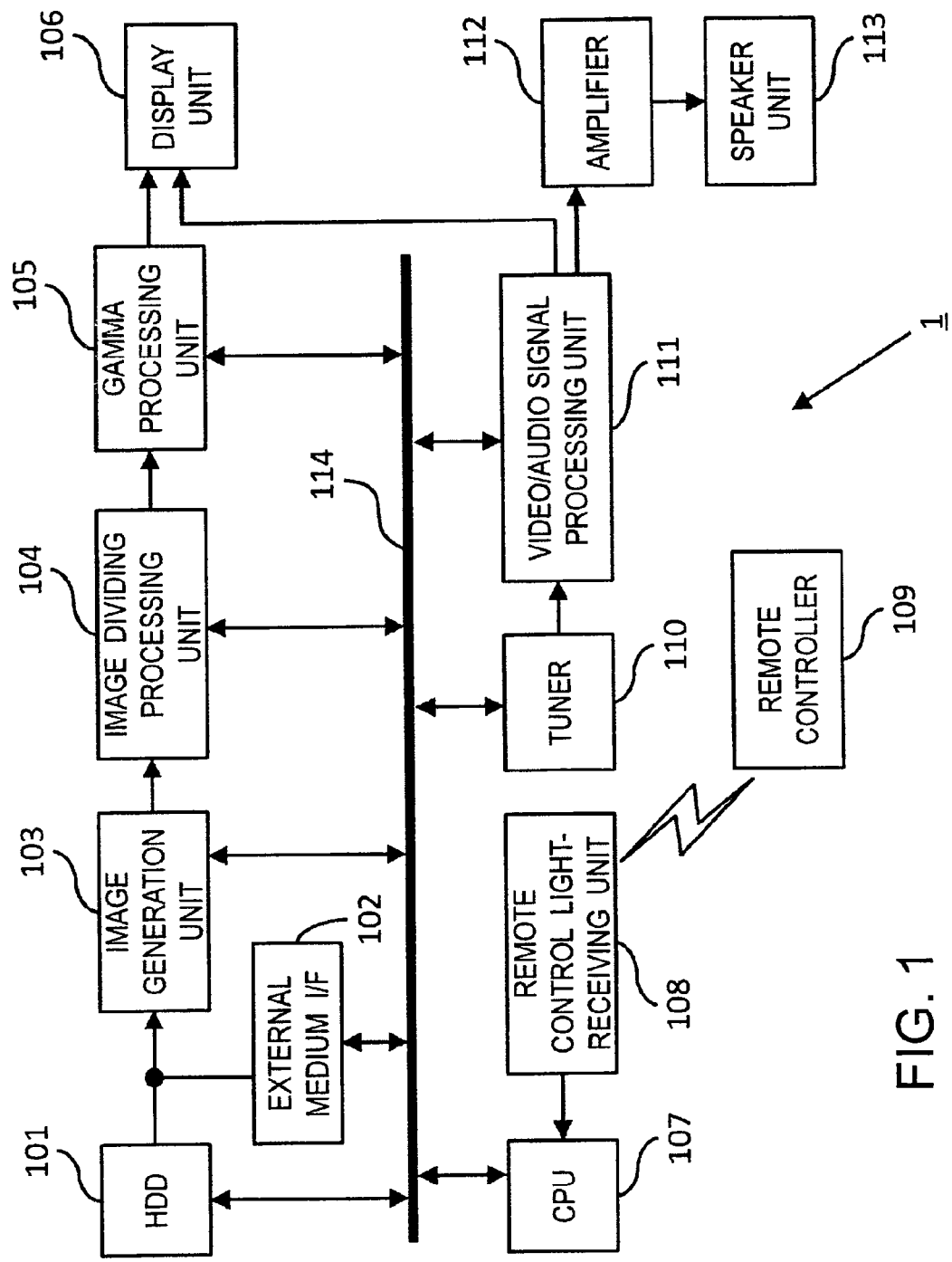
FIG. 1 is a block diagram showing a schematic configuration of a television broadcast receiving apparatus of a first embodiment.

Hereinafter, a first embodiment of an image processing apparatus according to this invention will be described in detail with reference to the accompanying drawings. In this embodiment, this invention is applied to a television broadcast receiving apparatus, which has a function of reading image data recorded in an internal storage and an external medium and generating and displaying index image data of thumbnail image data of the image data. FIG. 1 is a block diagram showing a schematic configuration of a television broadcast receiving apparatus 1 of this embodiment. The television broadcast receiving apparatus 1 includes an HDD 101, an external medium I/F 102, an image generation unit 103, an image dividing processing unit 104, a gamma processing unit 105, a display unit 106, and a CPU 107. The television broadcast receiving apparatus 1 further includes a remote control light-receiving unit 108, a remote controller 109, a tuner 110, a video/audio signal processing unit 111, an amplifier 112, a speaker unit 113, and a bus 114.

The CPU 107 is a central processing unit controlling the entire operation of the television broadcast receiving apparatus 1. The remote control light-receiving unit 108 receives a signal, output from the remote controller 109, by user's operation of the remote controller 109 to transfer the signal to the CPU 107. The CPU 107 converts the operation of the remote controller 109, transferred from the remote control light-receiving unit 108, into an operation instruction to the television broadcast receiving apparatus 1 and determines the operation of each block. Under the control of the CPU 107, the tuner 110 receives a broadcast wave, input from a terrestrial antenna or a parabolic antenna (not shown), to output the broadcast wave to the video/audio signal processing unit 111. In the video/audio signal processing unit 111, the broadcast wave is demodulated and decoded into a video signal and an audio signal. The video signal is output (displayed) by the display unit 106, and the audio signal is amplified by the amplifier 112 and thereafter output from the speaker unit 113. The HDD 101 is a built-in storage recording therein broadcast contents such as image data, moving image data, and television programs. The external medium I/F 102 is an optical drive or a memory card reader, which reads data recorded in a recording medium such as a DVD, a CD, and an SD card, or an interface such as a USB terminal and a DV terminal connecting an external apparatus such as a digital camera and a video camera. The image data and the moving image data read from a recording medium or an external apparatus through the external medium I/F 102 are transmitted to the HDD 101 to be recorded in the HDD 101 or are displayed in the display unit 106 under the control of the CPU 107.

<Image Generation Unit 103>

The image generation unit 103 performs processing of obtaining the thumbnail image data from a plurality of pieces of image data to generate the index image data of the thumbnail image data. Under the control of the CPU 107, the image generation unit 103 reads image data from the HDD 101 or reads image data from a recording medium or an external apparatus through the external medium I/F 102, and, at the same time, reads Exif data of the image data. Exif stands for Exchangeable Image File Format and is a standard for embedding the thumbnail image data and information such as photographing date and time in the image data of a JPEG (Joint Photographic Experts Group) format. When the Exif data exists in the image data read by the image generation unit 103, the image generation unit 103 obtains the thumbnail image data of each piece of image data from the Exif data. When there is no Exif data in the read image data, the image generation unit 103 reduces the size of the image data to generate the thumbnail image data. The image generation unit 103 generates the image data (referred to as the index image data) in which a plurality of thumbnail image data obtained thus is arranged in the form of matrix.

Figure 2:
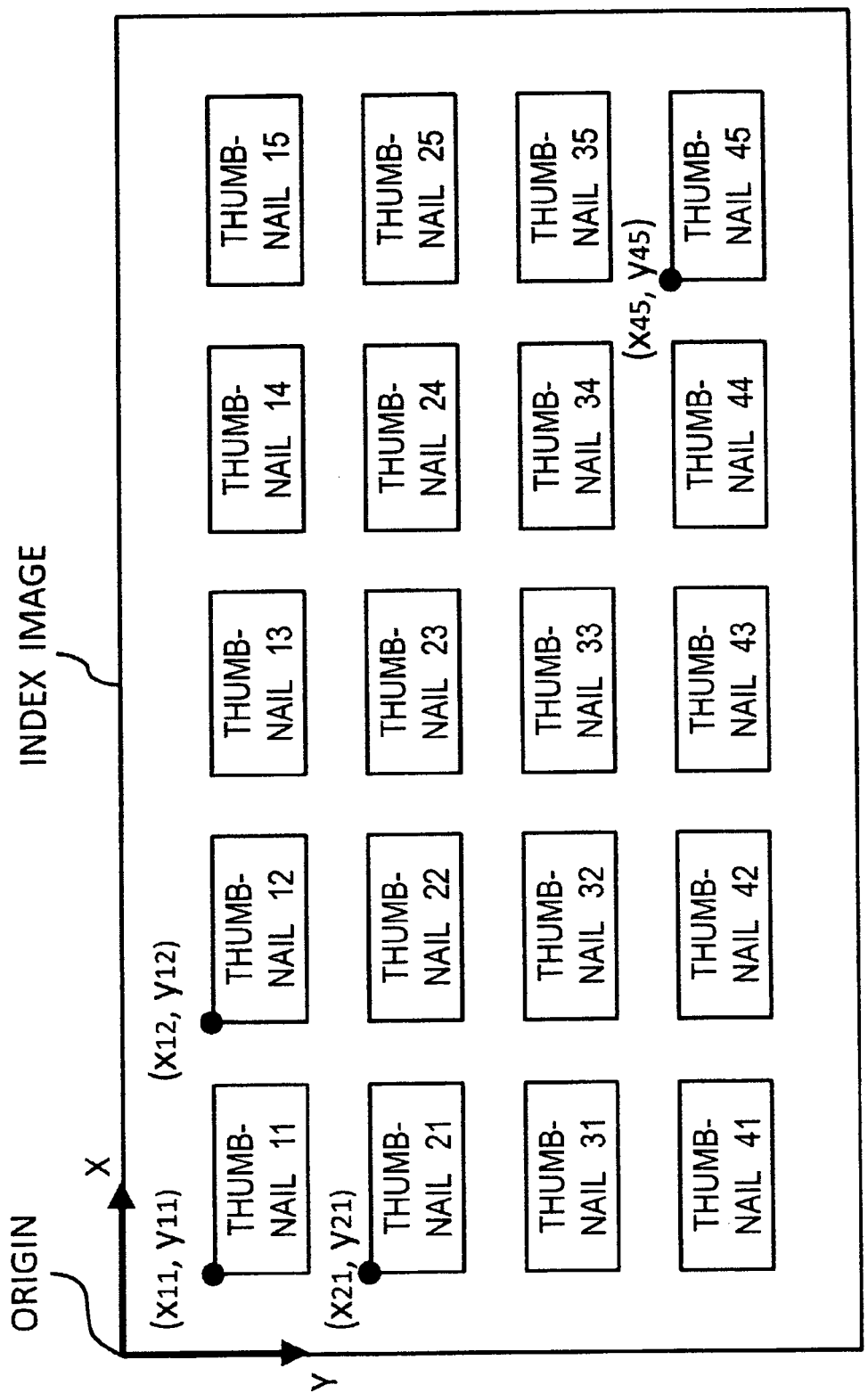
FIG. 2 is an example of index image data of thumbnail image data.

In this embodiment, the image generation unit 103 reads 20 image data from the HDD 101 and so on to obtain 20 thumbnail image data from the image data. As shown in FIG. 2, the obtained thumbnail image data are arranged in the form of matrix so that five pieces of thumbnail image data are arranged in the horizontal direction and the four pieces of thumbnail image data are arranged in the vertical direction, whereby the index image data is generated. In FIG. 2, the thumbnail image data, which is the x-th thumbnail image data in the horizontal direction and the y-th thumbnail image data in the vertical direction counted from the thumbnail image data disposed on the uppermost left side of the index image data, is named a "thumbnail yx" (1≤y≤4, 1≤x≤5).

The image generation unit 103 outputs the generated index image data and the arrangement information of the thumbnail image data to the image dividing processing unit 104. The arrangement information of the thumbnail image data is information showing a position where the thumbnail image data is arranged in the index image data and an arrangement pattern of the thumbnail image data and is information of, for example, coordinates of the thumbnail image data, the size, and the arrangement numbers in the vertical and horizontal directions. The coordinates of the thumbnail image data can be determined as the coordinates of the uppermost left pixel of the thumbnail image data, for example. As shown in FIG. 2, when the uppermost left pixel of the list display image is the origin of the coordinates, if the coordinates of the uppermost left pixel of a thumbnail 11 are (x11, y11), the coordinates of the thumbnail 11 are determined as (x11, y11).

The arrangement pattern of pieces of the thumbnail image data is not limited to the number shown in FIG. 2. For example, at least two pieces of thumbnail image data may be displayed in one frame. The arrangement pattern of the thumbnail image data in the index image data is not limited to the example shown in FIG. 2, and various arrangement patterns can be applied. For example, when the number of pieces of the thumbnail image data is 20, the thumbnail image data may be arranged so that five pieces of thumbnail image data are arranged in the horizontal direction and four pieces of thumbnail image data are arranged in the vertical direction, as shown in FIG. 2, or the thumbnail image data may be arranged so that four pieces of thumbnail image data are arranged in the horizontal direction and five pieces of thumbnail image data are arranged in the vertical direction, or ten pieces of thumbnail image data are arranged in the horizontal direction and two pieces of thumbnail image data are arranged in the vertical direction. The television broadcast receiving apparatus 1 may have a function that enables a user to switch those various arrangement patterns of the thumbnail image data. In this case, according to the operation contents of the remote controller 109 by the user, an instruction for how the thumbnail image data is arranged to generate the index image data is input from the CPU 107 to the image generation unit 103. The image generation unit 103 generates the index image data of the thumbnail image data arranged according to the arrangement pattern selected by the user, and, at the same time, outputs the arrangement information of the thumbnail image data to the image dividing processing unit 104.

The image generation unit 103 of this embodiment corresponds to the "generation unit" of this invention.

<Image Dividing Processing Unit 104>

The image dividing processing unit 104 obtains the index image data and the arrangement information of the thumbnail image data from the image generation unit 103 under the control of the CPU 107. The image dividing processing unit 104 then divides the index image data into a plurality of areas based on the arrangement information of the thumbnail image data. FIG. 3 is a view for explaining the dividing processing of the index image data.

Figure 3A:
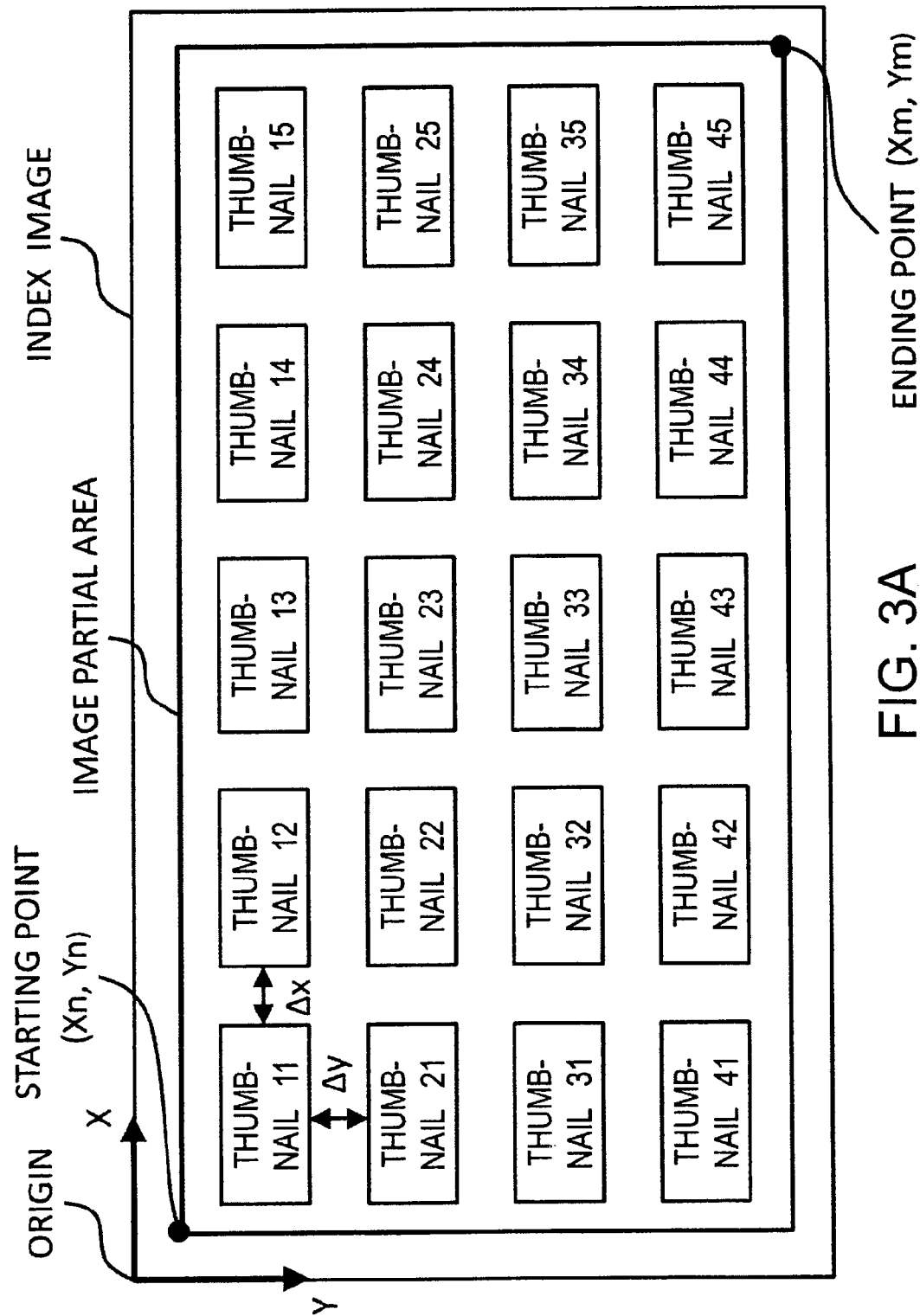
FIG. 3A is an example of an image partial area in the index image data.

The image dividing processing unit 104 first divides the index image data into an area (referred to as an "image partial area") for use in cutting out the partial area to be described later and the other areas. The image dividing processing unit 104 determines a range of the image partial area based on the arrangement information of the thumbnail image data input from the image generation unit 103. In this embodiment, as shown in FIG. 3A, the intervals in the horizontal and vertical directions between the thumbnail image data are calculated based on the coordinates of the thumbnail image data and the size of the thumbnail image data. An area wider than the existence range of the thumbnail image data by half the width of the intervals is the range of the image partial area. Namely, when the interval in the horizontal direction between the thumbnail image data is $\Delta x$, and the interval in the vertical direction is $\Delta y$, the coordinates $(Xn, Yn)$ of the starting point (the uppermost left point) of the image partial area are the coordinates of the relative position $(-\Delta x/2, -\Delta y/2)$ of the coordinates of the thumbnail 11 $(x11, y11)$. Meanwhile, the coordinates $(Xm, Ym)$ of the ending point (the uppermost right point) of the image partial area are the coordinates of the relative position $(+\Delta x/2, +\Delta y/2)$ of the coordinates of a thumbnail 45 $(x45, y45)$. As shown in FIG. 3A, when the coordinates of the starting point and the ending point of the image partial area do not coincide respectively with the origin of the index image data and the lowermost right point, the image partial area is the image data obtained by slightly cropping the width of the four sides of the index image data. Consequently, the index image data is divided into the image partial area including all thumbnail image data and a frame-shaped area provided along the outer circumference of the image partial area and not including the thumbnail image data. In the example shown in FIG. 3A, although the image partial area is the image data obtained by cropping the four sides of the index image data, the image partial area is not limited thereto in some arrangement patterns of the thumbnail image data. For example, the image partial area may be image data obtained by cropping only the upper and lower sides of the index image data or the left and right sides thereof or may be the same image data as the index image data.

Figure 3B:
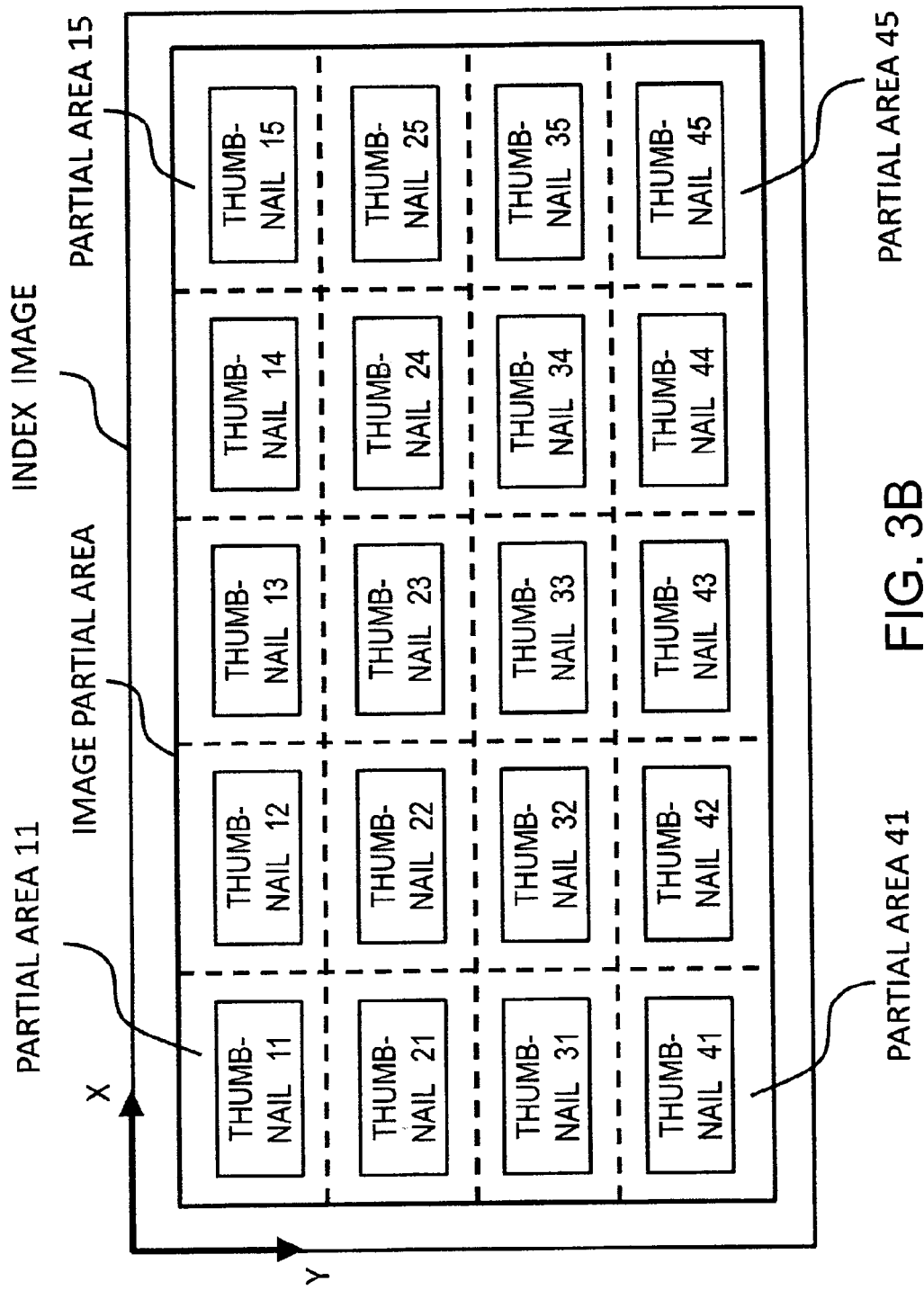
FIG. 3B is an example of a partial area.

The image dividing processing unit 104 then divides the image partial area into small areas (referred to as partial areas) as many as the number of pieces of thumbnail image data based on the arrangement information of the thumbnail image data. At this time, the image partial area is divided so that each piece of thumbnail image data is not included in the same partial area as the other thumbnail image data. In other words, the image partial area is divided so that one piece of thumbnail image data is included in each partial area. In this embodiment, as shown in FIG. 3B, the X-axis direction of the image partial area is equally divided (five equal areas) into the same number as the arrangement number in the X-axis direction of the thumbnail image data, and, at the same time, the image partial area in the Y-axis direction is equally divided (four equal areas) into the same number as the arrangement number in the Y-axis direction of the thumbnail image data. In this way, the image partial area is divided into 20 partial areas each including one piece of thumbnail image data. In the case of this embodiment, each partial area is, as shown in FIG. 3B, the image data in which a frame-shaped area with half the width of the interval between the thumbnail image data is added around the thumbnail image data. In FIG. 3B, the partial area, which is the m-th partial area in the horizontal direction and the n-th partial area in the vertical direction counted from the uppermost left partial area, is named a "partial area nm" ($1 \le n \le 4$, $1 \le m \le 5$). In the case of this embodiment, as shown in FIG. 3B, the partial area nm includes the thumbnail nm.

The index image data may be divided by any method as long as one piece of thumbnail image data is included in each partial area, and the above description is just an example.

The image dividing processing unit 104 of this embodiment corresponds to the "acquisition unit" and the "division unit" of this invention.

<Gamma Processing Unit 105>

Under the control of the CPU 107, the gamma processing unit 105 calculates a histogram of a luminance value of each pixel constituting the image data corresponding to the partial area for each partial area obtained by the dividing processing in the image dividing processing unit 104. The gamma processing unit 105 then determines a gamma curve (gamma correction characteristics) applied to the partial area according to the characteristics of the histogram to perform gamma correction using the gamma curve, and, thus, to reconfigure the index image data from the image data corresponding to each partial area after the gamma correction, whereby the index image data is output to the display unit 106. As a result, the index image data subjected to the gamma correction suitable for the characteristics of the luminance of the thumbnail image data is generated to be displayed in the display unit 106. The gamma curve can be determined by being generated from the histogram by predetermined calculation. Plural kinds of gamma curves are previously provided corresponding to a frequency distribution of the histogram suitable for each gamma curve, and an appropriate gamma curve is selected according to the frequency distribution of the histogram, whereby the gamma curve may be determined.

In this embodiment, the gamma correction for increasing the contract so that fundamentally, white is increased and black is reduced is applied to the image data corresponding to each partial area, and the gamma correction is adjusted according to the characteristics of the histogram. Specifically, with respect to the image data corresponding to the partial area having a peak in the high luminance portion of the histogram, the degree of increasing white is reduced relative to the image data corresponding to the other partial areas. Meanwhile, with respect to the image data corresponding to the partial area having a peak in the low luminance portion of the histogram, the degree of reducing black is reduced relative to the image data corresponding to the other partial areas. As a result, white out in the white portion of the thumbnail image data with high luminance is suppressed, and black out in the black portion of the thumbnail image data with low luminance is suppressed. Thus, both the thumbnail image data with high luminance and the thumbnail image data with low luminance can be increased in contrast while maintaining good gradation. According to this embodiment, the index image data is divided so that each partial area includes one piece of thumbnail image data, and the gamma correction is performed for each partial area using the gamma curve adjusted according to the histogram of each partial area. Thus, the image processing suitable for the characteristics of each piece of thumbnail image data can be performed. Accordingly, even when the index image data includes any thumbnail image data, with respect to all the thumbnail image data, the contrast can be increased while suppressing image quality deterioration.

The gamma correction according to the histogram of the image data corresponding to each partial area is not limited to the gamma correction based on increase in contrast that is adjusted according to the characteristics of the histogram. For example, with respect to the image data corresponding to the partial area having a peak in the high luminance portion of the histogram, the gamma correction may be performed using the gamma curve having a downward convex. Meanwhile, with respect to the image data corresponding to the partial area having a peak in the low luminance portion of the histogram, the gamma correction may be performed using the gamma curve having an upward convex. The gamma correction is adjusted for each of such image data corresponding to each partial area, whereby the gradation expression of individual pieces of thumbnail image data can be enhanced, and, at the same time, the index image data in which variation of luminance between the thumbnail image data is suppressed can be output.

The gamma processing unit 105 of this invention corresponds to the "calculation means", the "correction means", and the "output means" of this invention.

<Flow Chart>

A processing flow associated with generation and display of the index image data of the thumbnail image data in the television broadcast receiving apparatus 1 of this embodiment will be described based on FIG. 4.

In step S401, when the television broadcast receiving apparatus 1 receives an instruction of displaying the index image data of the thumbnail image data in the display unit 106 by user's operation of the remote controller 109, the processing proceeds to step S402.

In step S402, the image generation unit 103 obtains the thumbnail image data from the image data recorded in the HDD 101 or the image data read from a recording medium and an external apparatus trough the external medium I/F 102.

In step S403, the image generation unit 103 arranges the thumbnail image data, obtained in step S402, in the form of matrix to generate the index image data of the thumbnail image data.

In step S404, the image dividing processing unit 104 obtains the arrangement information of the thumbnail image data in the index image data generated by the image generation unit 103.

In step S405, the image dividing processing unit 104 determines the range of the image partial area in the index image data based on the arrangement information of the thumbnail image data obtained in step S404.

In step S406, the image dividing processing unit 104 divides the image partial area into the partial areas based on the arrangement information of the thumbnail image data obtained in step S404.

In step S407, the gamma processing unit 105 calculates the histogram of each pixel constituting the image data corresponding to the partial area.

In step S408, whether the calculation of the histogram by the gamma processing unit 105 is applied to the image data corresponding to all the partial areas is determined. If it is determined as NO, the processing returns to step S407, and the calculation of the histogram is performed with respect to the image data corresponding to the partial area next to the partial area subjected to the calculation of the histogram in the last execution of the processing of step S407. When the completion of the calculation of the histogram with respect to the image data corresponding to all partial areas is determined, the processing proceeds to step S409.

In step S409, the gamma processing unit 105 determines the gamma curve corresponding to the histogram of each pixel of the image data corresponding to a partial area, and the gamma processing unit 105 performs the gamma correction for each piece of image data corresponding to the partial area, using the determined gamma curve.

In step S410, whether the gamma correction by the gamma processing unit 105 is applied to the image data corresponding to all the partial areas is determined. When it is determined as NO, the processing returns to step S409, and the gamma correction is applied to the image data corresponding to the partial area next to the partial area subjected to the gamma correction in the last execution of the processing of step S409. When the completion of the gamma correction applied to the image data corresponding to all partial areas is determined, the processing proceeds to step S411.

In step S411, the index image data is reconfigured from the image data corresponding to each partial area subjected to the gamma correction in step S409, and the index image data is output to the display unit 106.

According to the above processing, the index image data in which the gamma correction is suitably applied to each piece of thumbnail image data is displayed in the display unit 106, and the control of the flow is terminated. According to the above processing, it is possible to perform a suitable correction for the characteristics of individual pieces of thumbnail image data.

(Modification)

The image data corresponding to the partial area includes the thumbnail image data and a frame-shaped area therearound, and therefore, when the gamma correction is applied to each piece of image data corresponding to the partial area, the luminance of the frame-shaped area may be different for each piece of image data corresponding to the partial area. Thus, the gamma correction may be applied only to the thumbnail image data part in the image data corresponding to each partial area. With this configuration, since the gamma correction is not applied to the frame-shaped area around the thumbnail image data, it is possible to prevent variation of the luminance in the frame-shaped area in each piece of image data corresponding to the partial area. Alternatively, with respect to the portion other than the thumbnail image data in the image data corresponding to the partial area, the gamma correction using the gamma curve that is the same in the image data corresponding to all partial areas may be performed.

In this embodiment, although the rectangular thumbnail image data are arranged in the form of matrix to generate the index image data, the shape and the arrangement pattern of the thumbnail image data are not limited thereto. For example, this invention can be applied to the case of generating the index image data in which a plurality of thumbnail image data are arranged at random positions and angles as in the case where actual photographs are spread on a desk. Also in this case, the index image data is divided based on the arrangement information of the thumbnail image data so that the image data corresponding to one partial area includes one piece of thumbnail image data. Then, the histogram of each pixel constituting the image data corresponding to the partial area is calculated for each partial area, and the gamma correction may be applied to each piece of image data corresponding to each partial area, using the gamma curve corresponding to the histogram. With this configuration, each piece of thumbnail image data can be displayed with optimum display quality.

In this embodiment, this invention is applied to the television broadcast receiving apparatus which generates the index image data from the image data recorded in an HDD or an external medium to output the index image data to the display part; however, the applicable scope of this invention is not limited to the television broadcast receiving apparatus. For example, this invention is also applicable to a recording apparatus, which includes an HDD as an internal storage and has a function of generating the index image data from the image data recorded in the HDD to output the index image data to a digital television or a monitor connected to the recording apparatus. In this case, in the block diagram of FIG. 1, the index image data subjected to the gamma correction and reconfigured by the gamma processing unit 105 is output not to the display unit 106 but to a video output terminal or the like of the recording apparatus.

Further, this invention is applicable to software that can be executed in a personal computer including an HDD as an internal storage and generates the index image data from the image data recorded in the HDD. In this case, in the block diagram of FIG. 1, the index image data subjected to the gamma correction and reconfigured by the gamma processing unit 105 is output to an image display device such as a liquid crystal monitor or a storage such as an HDD recording the index image data of the thumbnail image data as the image data.

In this embodiment and a second embodiment to be described later, the gamma correction processing is applied to the image data corresponding to each partial area. However, this invention is not limited to the gamma correction processing, but the other image processing can be used. For example, this invention is applicable to the image processing apparatus performing color correction processing such as chromatic correction as the image processing strongly related to the gamma correction. In the case of the chromatic correction, processing for adjusting a parameter of the chromatic correction from the frequency distribution of the histogram used in the gamma correction is generally performed. Thus, by virtue of the use of the histogram in each partial area, the parameter of the chromatic correction for each partial area is set, and suitable chromatic correction processing can be realized. Of course, this invention is not limited to the chromatic correction processing, but is applicable to an image processing apparatus performing enhancement processing such as edge enhancement processing and image quality improvement processing such as noise reduction processing. As described above, the object of this invention is to perform a suitable correction for the characteristics of individual pieces of thumbnail image data. Thus, as for which processing characteristics are used in the execution of the above image processing and how to perform the processing, the well-known techniques may be used, and the specific processing method and the processing characteristics may be suitably and arbitrarily determined in the design of the image processing apparatus.

(Second Embodiment)

Next, a second embodiment of the image processing apparatus according to this invention will be described. In this embodiment, as in the first embodiment, this invention is applied to the television broadcast receiving apparatus which has a function of generating the index image data of the thumbnail image data from the image data recorded in an internal storage or an external medium and displaying the index image data. The television broadcast receiving apparatus of the second embodiment has a function of scrolling the index image data of the thumbnail image data. The second embodiment is different from the first embodiment in that the thumbnail image data whose number exceeds the number of pieces of the thumbnail image data that can be displayed in one frame (in the second embodiment, 20 pieces of thumbnail image data) can be sequentially viewed by a scroll operation.

Figure 5A:
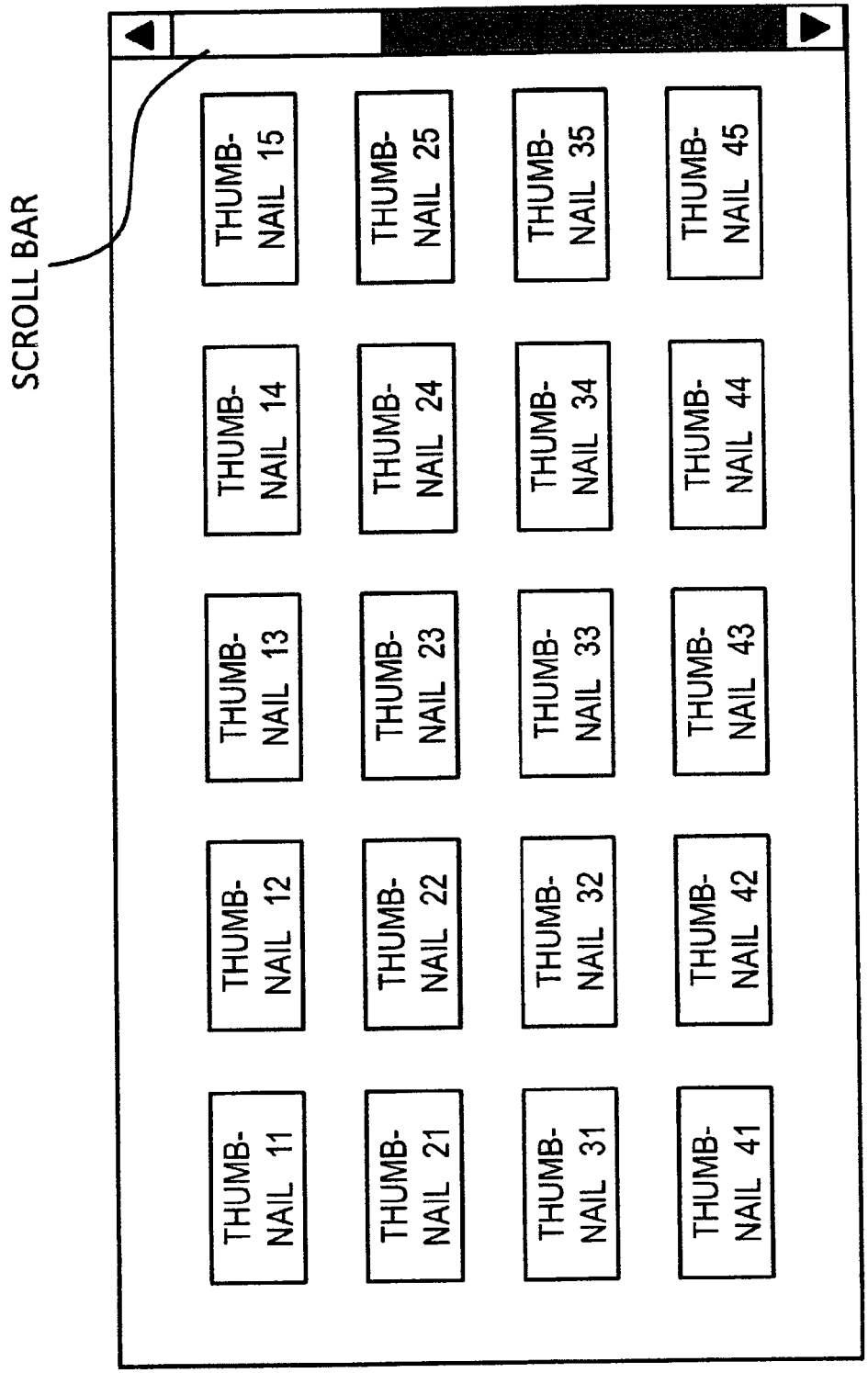
FIGS. 5A and 5B are examples of a GUI of the index image data of a second embodiment.
Figure 5B:
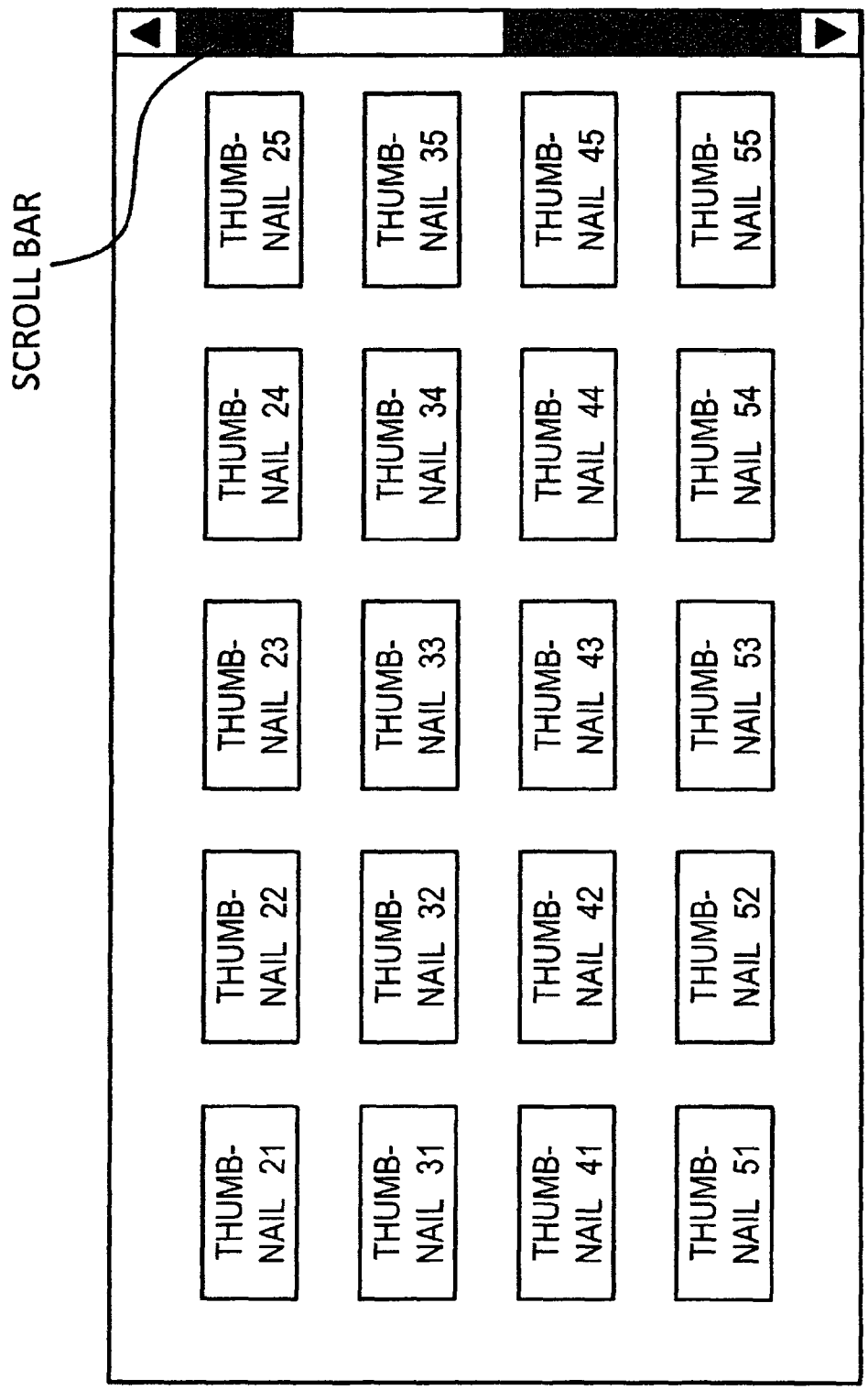

FIGS. 5A and 5B are views showing an example of displaying the index image data of the thumbnail image data generated and displayed by the television broadcast receiving apparatus of this embodiment. As shown in FIGS. 5A and 5B, in the index image data, the thumbnail image data and a scroll bar, which is a GUI (Graphical User Interface) for use in the operation of scrolling the index image data vertically, are simultaneously displayed. A user can move the scroll bar vertically by operating the remote controller 109. For example, when a key (for example, a down key of a cursor key) of the remote controller 109 assigned to the operation of moving the scroll bar downward is depressed in a state that the index image data as shown in FIG. 5A is displayed, the scroll bar in the index image data is moved downward. Accompanying this, regarding the thumbnail image data currently displayed in the index image data, the five pieces of thumbnail image data (thumbnails 11 to 15) in the highest line disappear, and the display positions of the thumbnail image data currently displayed in the second, third, and fourth lines of the index image data are moved upward by one line. Further, new five pieces of thumbnail image data (thumbnails 51 to 55) appear in the lowest line. In other words, the five pieces of thumbnail image data in the highest line which are part of the current thumbnail image data are replaced with the new five pieces of thumbnail image data. Then, the arrangement positions of the remaining current thumbnail image data are shifted upward by one line, and the new five pieces of thumbnail image data are arranged in the lowest line. According to this constitution, the index image data of the thumbnail image data is updated as shown in FIG. 5B. When the up key of the cursor key of the remote controller 109 is depressed, the inverse processing is performed. Namely, the thumbnail image data in the lowest line which are part of the current thumbnail image data are replaced with the new thumbnail image data. Then, the thumbnail image data in the first to third lines which are the remaining thumbnail image data of the current thumbnail image data are shifted downward by one line to be arranged in the second to fourth lines, and the new thumbnail image data are arranged in the highest line. According to the scroll operation and the update processing of the index image data according to this scroll operation, the thumbnail image data whose number exceeds the number of the thumbnail image data that can be displayed in one frame (in FIG. 5, 20 pieces of thumbnail image data) can be sequentially viewed by a simple operation. Thus, this embodiment is especially useful for when a large amount of image data is stored in storage. In this embodiment, there will be described an example in which this invention is applied to the television broadcast receiving apparatus having the function of generating and displaying the index image data of the thumbnail image data.

The block diagram of the television broadcast receiving apparatus of this embodiment is the same as that of the first embodiment and is shown in FIG. 1; however, the contents of the processing performed by the image generation unit 103 and the gamma processing unit 105 are different from those of the first embodiment. Further, a function associated with display and control of the GUI of the scroll bar is added to the remote control light-receiving unit 108 and the CPU 107. Namely, when the remote control light-receiving unit 108 receives an operation signal from the remote controller 109 instructing the movement operation of the scroll bar, the image generation unit 103 obtains five pieces of thumbnail image data newly displayed in the index image data. Then, the thumbnail image data currently displayed in the second, third, and fourth lines are arranged in the first, second, and third lines, and, at the same time, the newly obtained five pieces of thumbnail image data are arranged in the fourth line, whereby the index image data of the thumbnail image data is updated. The gamma processing unit 105 divides the updated index image data into the partial areas by the similar method to the first embodiment. Then, the histogram of the luminance value of each pixel constituting the image data corresponding to the partial area (the partial area in the fourth line) including the new thumbnail image data of the partial areas is calculated, and the gamma curve is determined according to the histogram. Then, the gamma correction is applied to each piece of image data corresponding to the partial area including the new thumbnail image data, using the gamma curve. With respect to the image data corresponding to the partial areas (the partial areas in the first, second, and third lines) including the thumbnail image data in common before and after update, the result of the gamma correction applied to the image data corresponding to the partial areas in the second, third, and fourth lines is diverted in the reconfiguration from the index image data before being updated. The index image data is reconfigured from the image data corresponding to the partial area (the partial area in the fourth line) newly subjected to the gamma correction and the image data corresponding to the partial areas (partial areas in the first, second, and third lines) subjected to the gamma correction in the reconfiguration of the index image data before being updated. The reconfigured index image data is then output to the display unit 106. According to this constitution, with respect to the five pieces of thumbnail image data newly displayed in the index image data, the gamma correction suitable for the characteristics of each piece of thumbnail image data is performed, and the contrast of the image can be increased while suppressing image quality deterioration. Further, the gamma correction after scrolling is applied only to the image data corresponding to the partial area including thumbnail image data made to newly appear by scrolling. Thus, a load related to the gamma correction processing can be reduced, and the processing of updating the index image data accompanying the scroll operation can be smoothly performed.

<Flow Chart>

Figure 6A:
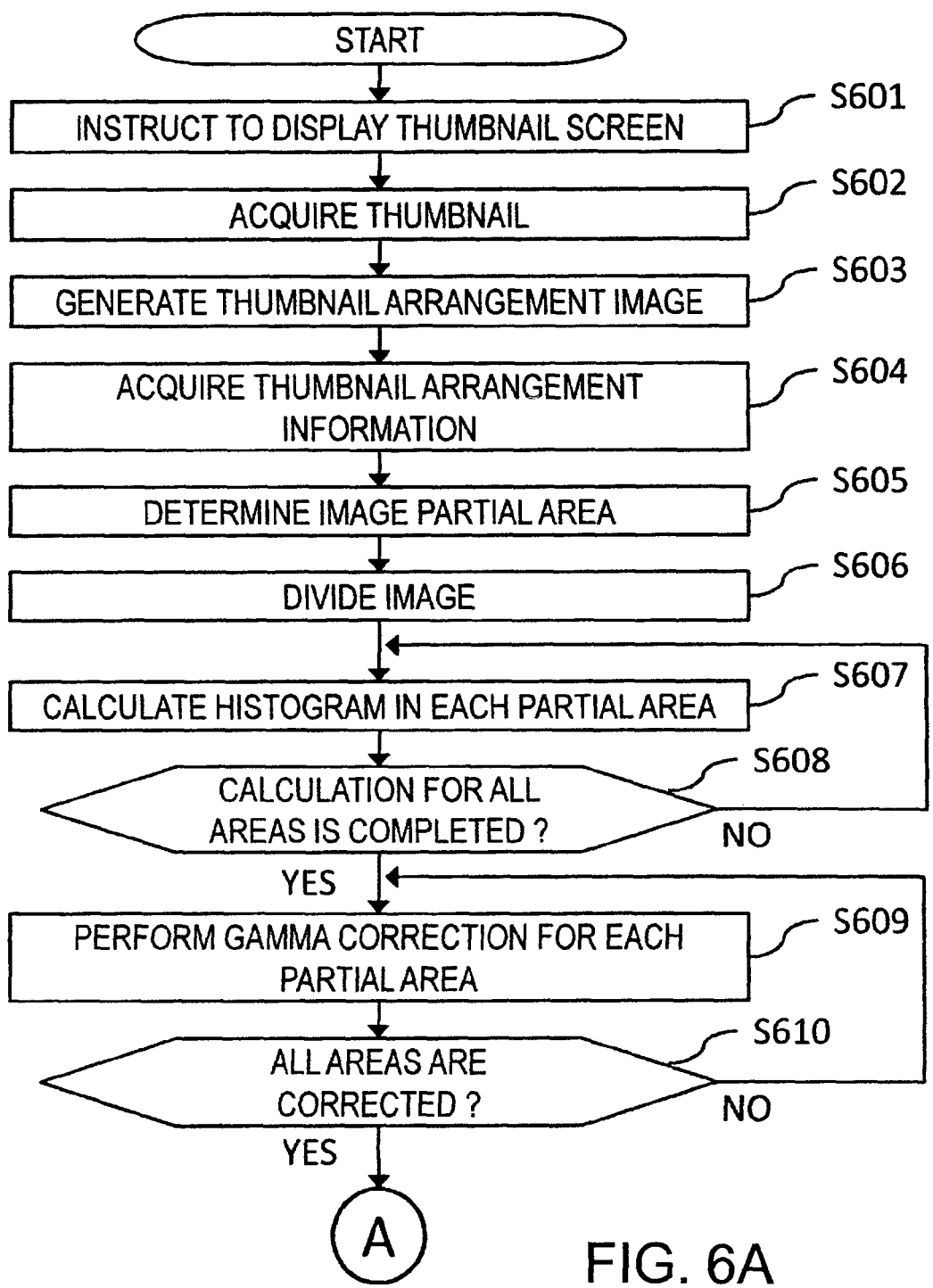
FIGS. 6A and 6B are control flows showing processing of generating the index image data in the second embodiment.
Figure 6B:
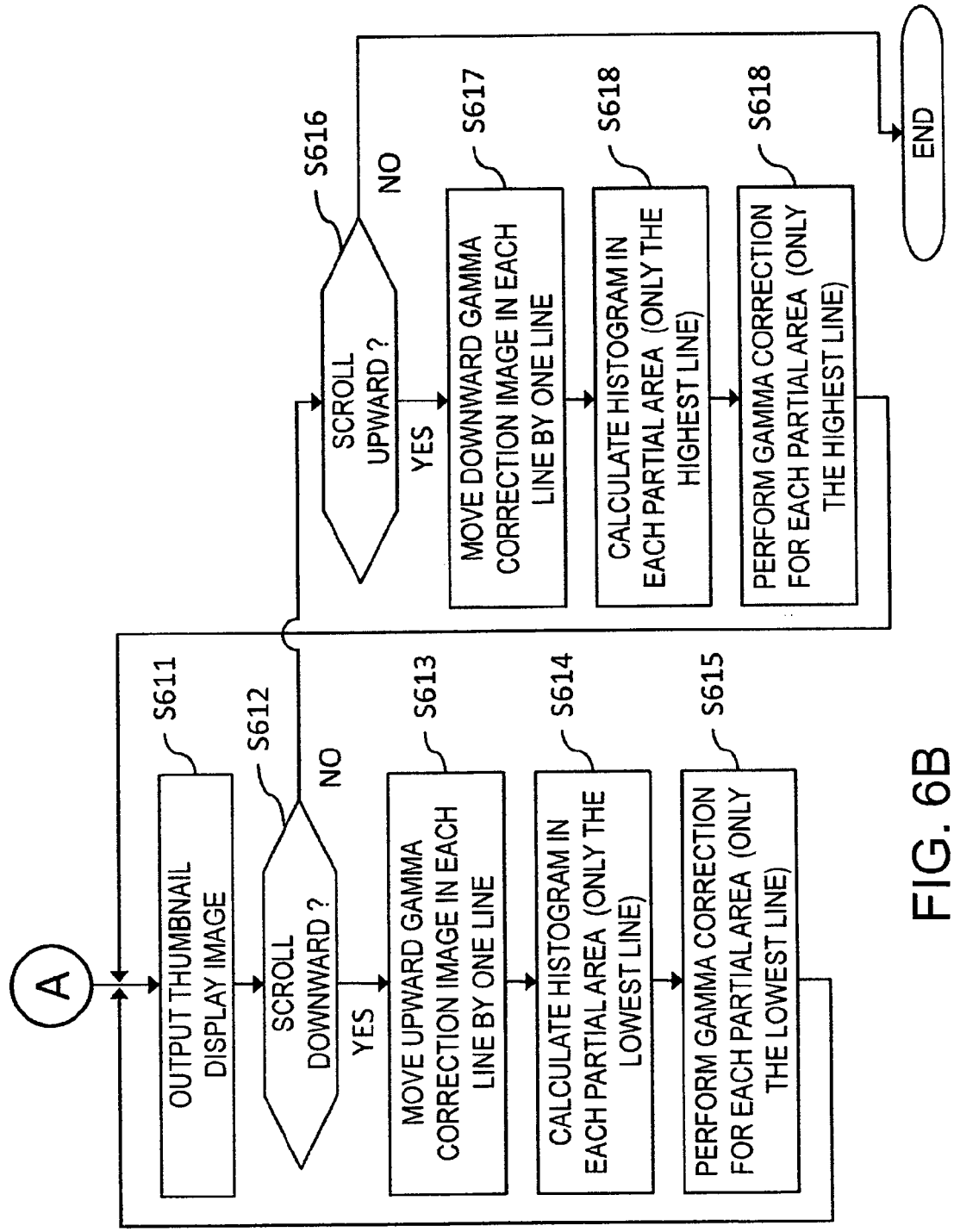

Next, a control flow of generating and displaying the index image data of the thumbnail image data in the television broadcast receiving apparatus 1 of this embodiment will be described based on FIGS. 6A and 6B.

Figure 4:
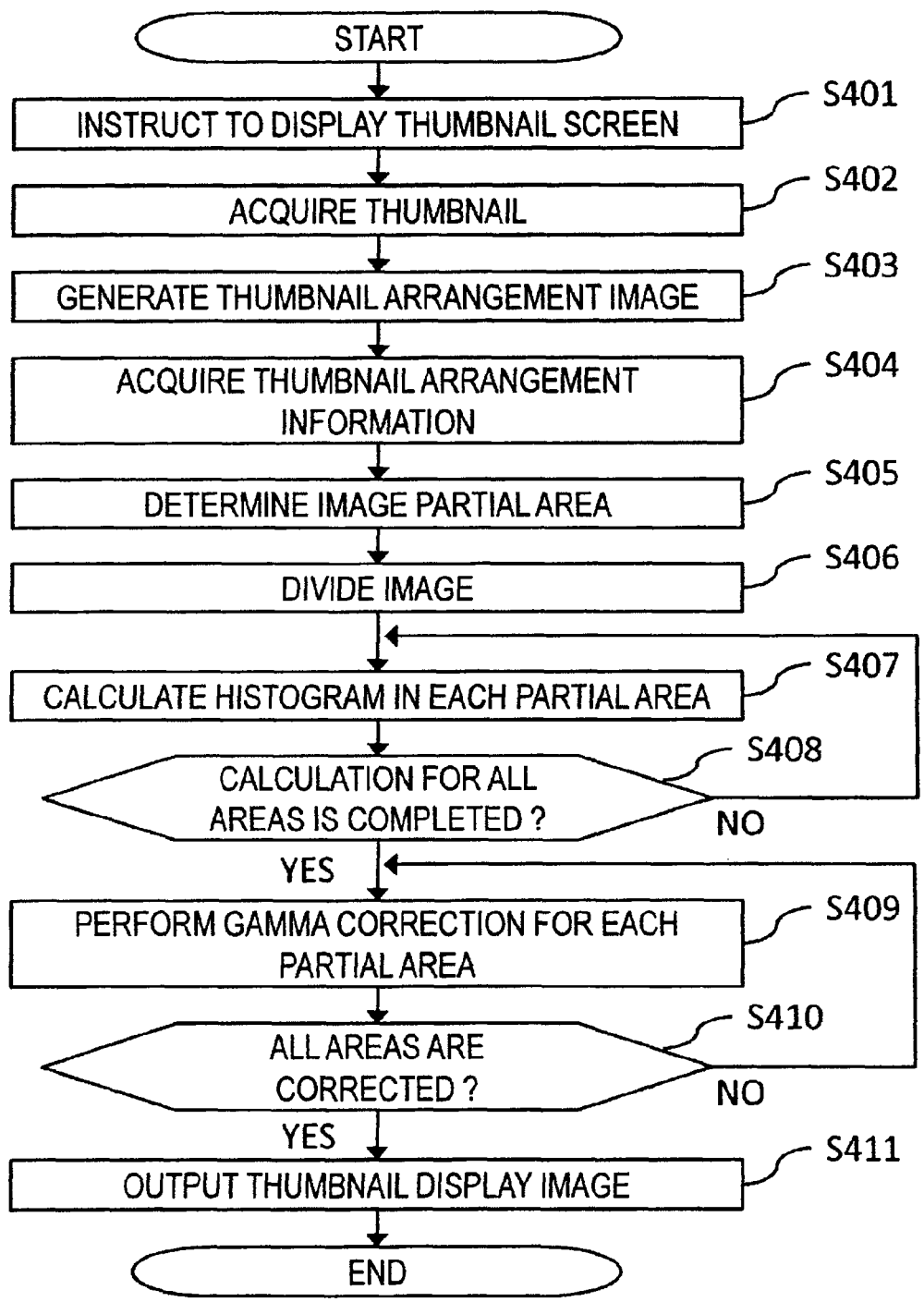
FIG. 4 is a control flow showing processing of generating the index image data in the first embodiment.

Since the contents of processing from steps S601 to S611 are the same as the contents of processing from steps S401 to S411 of the flow chart of FIG. 4 described in the first embodiment, the description will be omitted.

In step S612, whether an instruction of scrolling downward the scroll bar of the index image data by user's operation of the remote controller 109 is issued is determined. When it is determined as NO, the processing proceeds to step S616 to be described later. When it is determined as YES, the processing proceeds to step S613.

In step S613, the image generation unit 103 moves upward the gamma correction image data in each line by one line. The gamma correction image data is the image data corresponding to the partial area subjected to the gamma correction by the gamma processing unit 105. The upward movement of the gamma correction image data in each line by one line means as follows. Namely, the image data corresponding to a partial area 1m ($1 \leq m \leq 5$) in the first line is eliminated from the index image data, and the image data corresponding to partial areas nm ($2 \leq n \leq 4$, $1 \leq m \leq 5$) in the second, third, and fourth lines are arranged respectively in the first, second, and third lines. The image generation unit 103 reads the image data, corresponding to the thumbnail image data to be newly displayed, from the HDD 101 or from a recording medium or an external apparatus through the external medium I/F 102. The image generation unit 103 obtains the thumbnail image data, which will be newly displayed, from the read image data to arrange the thumbnail image data in the lowest line of the index image data. In the example of FIG. 5, the image generation unit 103 obtains the thumbnails 51 to 55 from the corresponding image data to arrange the thumbnails 51 to 55 at the position where the thumbnails 41 to 45 are arranged in the index image data before scrolling, whereby the index image data is updated. Regarding the partial areas obtained by dividing the updated index image data, with respect to the image data corresponding to the partial areas (in the example of FIG. 3B, the partial areas 11 to 35) other than the partial areas in the lowest line, gamma correction is already performed in the reconfiguration of the index image data before being updated. Thus, in the flowing processing, gamma correction is applied only to the image data corresponding to the partial areas (in the example of FIG. 3B, the partial areas 41 to 45) in the lowest line including the new thumbnail image data.

In step S614, the gamma processing unit 105 calculates the histogram of the luminance value of each pixel constituting the image data corresponding to each partial area in the lowest line.

In step S615, the gamma processing unit 105 determines the gamma curve corresponding to the histogram of the image data corresponding to each of the partial areas in the lowest line and applies gamma correction to each piece of image data corresponding to each partial area, using the gamma curve.

The processing proceeds to step S611, and the index image data is reconfigured from the image data, corresponding to the partial areas 11 to 35 subjected to the gamma correction in the reconfiguration of the index image data before being updated and the image data corresponding to the partial areas 41 to 45 newly subjected to gamma correction in step S615. The reconfigured index image data is then output to the display unit 106.

In step S616, whether an instruction of scrolling upward the scroll bar of the index image data by user's operation of the remote controller 109 is issued is determined. When it is determined as NO, the processing of the flow chart is terminated. When it is determined as YES, the processing proceeds to step S617.

In step S617, the image generation unit 103 moves the gamma corrected image data in each line downward by one line. The downward movement of the gamma corrected image data in each line by one line means as follows. Namely, the image data corresponding to a partial area 4m (1≤m≤5) in the fourth line is eliminated from the index image data, and the image data corresponding to partial areas nm (1≤n≤3, 1≤m≤5) in the first, second, and third lines are arranged respectively in the second, third, and fourth lines. The image generation unit 103 reads the image data, corresponding to the thumbnail image data to be newly displayed, from the HDD 101 or from a recording medium or an external apparatus through the external medium I/F 102. The image generation unit 103 obtains the thumbnail image data to be newly displayed from the read image data to arrange the thumbnail image data in the highest line in the index image data, whereby the index image data is updated. Regarding the partial areas obtained by dividing the updated index image data, with respect to the image data corresponding to the partial areas (in the example of FIG. 3B, the partial areas 21 to 45) other than the partial areas in the highest line, gamma correction is already performed in the reconfiguration of the index image data before being updated. Thus, in the flowing processing, gamma correction is applied only to the image data corresponding to the partial areas in the highest line (in the example of FIG. 3B, the partial areas 11 to 15).

In step S618, the gamma processing unit 105 calculates the histogram of the luminance value of each pixel constituting the image data corresponding to each partial area in the highest line.

In step S619, the gamma processing unit 105 determines the gamma curve corresponding to the histogram of the image data corresponding to each partial area in the highest line and applies the gamma correction to each piece of image data corresponding to each partial area, using the gamma curve.

The processing proceeds to step S611, and the index image data is reconfigured from the image data, corresponding to the partial areas 21 to 45 subjected to the gamma correction in the reconfiguration of the index image data before being updated and the image data corresponding to the partial areas 11 to 15 newly subjected to gamma correction in step S619. The reconfigured index image data is then output to the display unit 106.

According to the above processing, with respect to the thumbnail image data newly displayed in the index image data accompanying the scroll operation, the contrast can be increased while suppressing image quality deterioration, and, in addition, the processing load of the gamma correction due to this can be minimized. Namely, a suitable correction for the characteristics of individual pieces of thumbnail image data can be performed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-194272, filed on Aug. 25, 2009, which is hereby incorporated by reference herein its entirety.

What is claimed is:

1. An image processing apparatus comprising:
a determination unit which determines a plurality of areas in a multi image including a plurality of images each of which is arranged at a different position in the multi image;
a detection unit which detects image characteristics of the respective areas;
a correction unit which determines image correction characteristics for the respective areas based on the corresponding image characteristics of the respective areas, and, performs image correction to each of the plurality of areas by using the corresponding image correction characteristic for each of the plurality of areas,
wherein the image correction performed by the correction unit includes gamma correction and other image correction which is related to the gamma correction.

2. The image processing apparatus according to claim 1, wherein
the determination unit determines the plurality of areas in the multi image including the plurality of images based on information regarding the plurality of images.

3. The image processing apparatus according to claim 2, further comprising:
an acquisition unit which acquires arrangement information indicating a position where each of the plurality of images is arranged in the multi image, wherein
the information regarding the plurality of images is the arrangement information.

4. The image processing apparatus according to claim 1, wherein
the image characteristic of each of the plurality of areas is a histogram of a luminance value of pixels constituting an image or images included in each of the plurality of areas.

5. The image processing apparatus according to claim 1, wherein
each of the plurality of images is a thumbnail image.

6. The image processing apparatus according to claim 5, further comprising:
a generation unit which generates the multi image, wherein the generation unit has an update unit which updates the multi image by replacing one or more thumbnail images included in the multi image with one or more other thumbnail images, respectively, and when the multi image is updated by the update unit, the determination unit determines the areas in the multi image updated by the update unit, the detection unit detects image characteristics of the respective areas including the other thumbnail images, the correction unit determines image correction characteristics for respective areas including the other thumbnail images based on the corresponding image characteristics of the respective areas including the other thumbnail images, and, performs image correction to each of the one or more areas including the other thumbnail image by using the corresponding image correction characteristic for each of the one or more areas.

7. The image processing apparatus according to claim 1, wherein the correction unit performs image correction to pixels constituting each of the plurality of images included in each of the plurality of areas by using the corresponding image correction characteristic for each of the plurality of areas.

8. The image processing apparatus according to claim 1, wherein the other image correction performed by the correction unit includes color correction.

9. The image processing apparatus according to claim 8, wherein the color correction includes chromatic correction.

10. The image processing apparatus according to claim 1, wherein the multi image is configured by arranging the areas subjected to the image correction by the correction unit.

11. An image processing method comprising:

a determination step of determining a plurality of areas in a multi image including a plurality of images each of which is arranged at different positions in the multi image;

a detection step of detecting image characteristics of the respective areas;

a correction step of determining image correction characteristics for the respective areas based on the corresponding image characteristics of respective areas, and, performing image correction to each of the plurality of areas by using the corresponding image correction characteristic for each of the plurality of areas, wherein the image correction performed in the correction step includes gamma correction and other image correction which is related to the gamma correction.

12. The image processing method according to claim 11, wherein the determination step determines the plurality of areas in the multi image including the plurality of images based on information regarding the plurality of images.

13. The image processing method according to claim 12, further comprising an acquisition step of acquiring arrangement information indicating a position where each of the plurality of images is arranged in the multi image, wherein the information regarding the plurality of images is the arrangement information.

14. The image processing method according to claim 11, wherein the image characteristic of each of the plurality of areas is a histogram of a luminance value of pixels constituting an image or images included in each of the plurality of areas.

15. The image processing method according to claim 11, wherein each of the plurality of images is a thumbnail image.

16. The image processing method according to claim 15, further comprising:

a generation step of generating the multi image, wherein the generation step has an update step of updating the multi image by replacing one or more thumbnail images included in the multi image with one or more other thumbnail images, respectively, and when the multi image is updated in the updating step, the determination step determines the areas in the multi image updated in the update step, the detection step detects image characteristics of the respective areas including the other thumbnail images, the correction step determines image correction characteristics for respective areas including the other thumbnail images based on the corresponding image characteristics of the respective areas, and, performs image correction to each of the one or more areas including the other thumbnail images by using the corresponding image correction characteristic for each of the plurality of areas.

17. The image processing method according to claim 11, wherein the correction step performs image correction to pixels constituting each of the plurality of images included in each of the plurality of areas by using the corresponding image correction characteristic for each of the plurality of areas.

18. The image processing method according to claim 11, wherein the other image correction performed in the correction step includes color correction.

19. The image processing method according to claim 18, wherein the color correction includes chromatic correction.

20. The image processing method according to claim 11, wherein the multi image is configured by arranging the areas subjected to the image correction in the correction step.

21. An image display apparatus comprising:

a display unit which displays a multi image including a plurality of images each of which is arranged at a different position in the multi image;

a determination unit which determines a plurality of areas in the multi image;

a detection unit which detects image characteristics of the respective areas;

a correction unit which determines image correction characteristics for the respective areas based on the corresponding image characteristics of the respective areas, and, performs image correction to each of the plurality of areas by using the corresponding image correction characteristic for each of the plurality of areas, wherein the image correction performed by the correction unit includes gamma correction and other image correction which is related to the gamma correction.

22. An image display method comprising:

a display step of displaying a multi image including a plurality of images each of which is arranged at a different position in the multi image;

a determination step of determining a plurality of areas in the multi image;

a detection step of detecting image characteristics of the respective areas;

a correction step of determining image correction characteristics for the respective areas based on the corresponding image characteristics of the areas, and, performing image correction to each of the plurality of areas by using the corresponding image correction characteristic for each of the plurality of areas, wherein the image correction performed by the correction unit includes gamma correction and other image correction which is related to the gamma correction.

23. The image processing apparatus according to claim 1, wherein the correction unit corrects multi image data regarding to the multi image based on the corresponding image correction characteristic for each of the plurality of areas, further comprising:

an output unit that outputs the multi image data to a display apparatus.

24. The image processing method according to claim 11, wherein the correction step corrects multi image data regarding to the multi image based on the corresponding image correction characteristic for each of the plurality of areas, further comprising:

an output step of outputting the multi image data to a display apparatus.

25. The image processing apparatus according to claim 1, wherein the other image correction performed by the correction unit includes edge enhancement processing.

26. The image processing apparatus according to claim 1, wherein the other image correction performed by the correction unit includes noise reduction processing.

27. The image processing method according to claim 11, wherein the other image correction performed in the correction step includes edge enhancement processing.

28. The image processing method according to claim 11, wherein the other image correction performed in the correction step includes noise reduction processing.

* * * * *